(12) United States Patent
Yamashita et al.

(10) Patent No.: US 9,125,536 B2
(45) Date of Patent: Sep. 8, 2015

(54) HOSE ASSEMBLY

(75) Inventors: Kazuya Yamashita, Hyogo (JP);
Yasuhiro Inori, Hyogo (JP); Akihiro Tsuno, Osaka (JP)

(73) Assignee: TIGERS POLYMER CORPORATION, Osaka (JP)

( * ) Notice: Subject to any disclaimer, the term of this patent is extended or adjusted under 35 U.S.C. 154(b) by 551 days.

(21) Appl. No.: 13/474,781

(22) Filed: May 18, 2012

(65) Prior Publication Data

US 2012/0312409 A1 Dec. 13, 2012

(30) Foreign Application Priority Data

Jun. 10, 2011 (JP) ................................. 2011-130045

(51) Int. Cl.

| F16L 11/00 | (2006.01) |
|---|---|
| A47L 9/24 | (2006.01) |
| F16L 11/15 | (2006.01) |
| F16L 25/00 | (2006.01) |
| F16L 13/12 | (2006.01) |

(52) U.S. Cl.
CPC ................. *A47L 9/242* (2013.01); *A47L 9/248* (2013.01); *F16L 11/15* (2013.01); *F16L 13/122* (2013.01); *F16L 25/0036* (2013.01)

(58) Field of Classification Search
CPC ........... A47L 9/24; A47L 9/242; A47L 9/248; F16L 11/15; F16L 11/16; F16L 13/122; F16L 25/0036; F16L 25/0045; F16L 25/0054
USPC .................... 138/109, 121, 122, 129
See application file for complete search history.

(56) References Cited

U.S. PATENT DOCUMENTS

| 2008/0223472 A1 | 9/2008 | Jeon et al. |
| 2009/0309353 A1 | 12/2009 | Linhart et al. |

FOREIGN PATENT DOCUMENTS

| CN | 2320194 Y | 5/1999 |
|---|---|---|
| CN | 1189128 C | 2/2005 |
| EP | 2133018 A1 | 12/2009 |
| JP | 58044582 U | 3/1983 |
| JP | 05076469 A | 3/1993 |
| JP | 09014526 A | 1/1997 |
| JP | 1043102 A | 2/1998 |

(Continued)

OTHER PUBLICATIONS

Extended European Search Report issued Nov. 20, 2013, corresponds to EP Patent application No. 12168752.9.

(Continued)

*Primary Examiner* — J. Casimer Jacyna
(74) *Attorney, Agent, or Firm* — Lowe Hauptman & Ham, LLP (57) ABSTRACT

A hose assembly includes a hose and a joint member integrated with the hose. The joint member includes an inner unit to be arranged on an inside of the hose. The hose includes a hose main body and a lip. The hose main body includes a groove portion and a protrusion portion formed in a spiral shape on an inner surface thereof. The lip includes a first end portion and a second end portion aligned in an axial direction of the hose and spirally provided to cover the groove portion. At least one of the first end portion and the second end portion is a fixed end integrated with the protrusion portion. The hose further includes a first region and a second region. A portion of the lip is positioned within the first region, and another portion of the lip is positioned within the second region.

6 Claims, 6 Drawing Sheets

(56) References Cited

FOREIGN PATENT DOCUMENTS

| JP | 11159668 A | 6/1999 |
| JP | 2008220922 A | 9/2008 |
| JP | 2009250273 A | 10/2009 |
| JP | 2011055877 A | 3/2011 |

OTHER PUBLICATIONS

Office Action dated Dec. 25, 2013, corresponds to Chinese patent application No. 201210156977.3.
Office Action issued Apr. 23, 2013 corresponds to Japanese Patent Application 2011-130045.

HOSE ASSEMBLY

CROSS-REFERENCE TO RELATED APPLICATION

This application is based on Japanese Patent Application No. 2011-130045 filed with the Japan Patent Office on Jun. 10, 2011, the entire content of which is hereby incorporated by reference.

BACKGROUND

1. Technical Field

The embodiments disclosed herein relate to a hose assembly including a flexible hose and a joint member connected to and integrated with an end portion of the flexible hose. Particularly, the embodiments disclosed herein relate to a hose assembly including a hose and a joint member, where the hose has a hose main body having a spiral groove portion formed on an inner surface thereof and a lip arranged to cover the groove portion, and the joint member is connected to and integrated with the hose.

2. Related Art

The flexible hoses have been used for various applications, such as a vacuum cleaner, a suction apparatus, and a drainage facility. Integrating a joint member with an end portion of a flexible hose is convenient for allowing the hose to be connected with another apparatus through the joint member. Recently, an injection molding technique so called "over-molding" or "insert molding" has been used to integrate a flexible hose and a joint member. In such a technique, a ready-made joint member is first inserted into an end portion of a flexible hose. Subsequently, the hose end portion and the joint member are introduced into an injection mold. Then, resin is injected into the mold and then solidified to integrate the hose end portion and the joint member together.

For example, JP-A-2009-250273 discloses a method for applying the over-molding technique (insert molding technique) to a flexible hose having spiral protrusions and grooves. In this technique, a joint member includes an inner member and an outer member. The outer member has a spirally shaped protrusion to be screwed into the groove of the hose. An axial position of an end portion of the hose is adjusted by rotation of the outer member. Subsequently, resin is injected. Such a technique can prevent existence of space between the hose end portion and the inner member, thereby preventing a problem in which the resin injected in an insert molding process leaks inside the hose.

Moreover, JP-A-2011-055877 discloses a vacuum cleaner hose having good flexibility and good collapse resistance while having low air flow resistance. That is, this hose includes a main body and a lip portion. The main body is formed in a corrugated shape, and has a spiral groove portion on an inner surface thereof. The lip portion covers the spiral groove portion of the main body. The lip portion is made of resin that is softer than that of the main body.

SUMMARY

A hose assembly according to the present disclosure includes: a hose; and a joint member integrated with the hose, wherein the joint member includes an inner unit to be arranged on an inside of the hose, the hose includes a hose main body and a lip, the hose main body includes a groove portion and a protrusion portion formed in a spiral shape on an inner surface thereof, the lip includes a first end portion and a second end portion aligned in an axial direction of the hose, and the lip is spirally provided to cover the groove portion, at least one of the first end portion and the second end portion is a fixed end integrated with the protrusion portion, the hose further includes a first region and a second region adjacent to the first region, the first region including an end portion fitting to the inner unit of the joint member and a portion being provided next to the end portion and extending out from the inner unit, a portion of the lip is positioned within the first region, and both of the first end portion and the second end portion are the fixed ends within the first region, and another portion of the lip is positioned within the second region, and only one of the first end portion and the second end portion is the fixed end.

DESCRIPTION OF EMBODIMENTS

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 11:
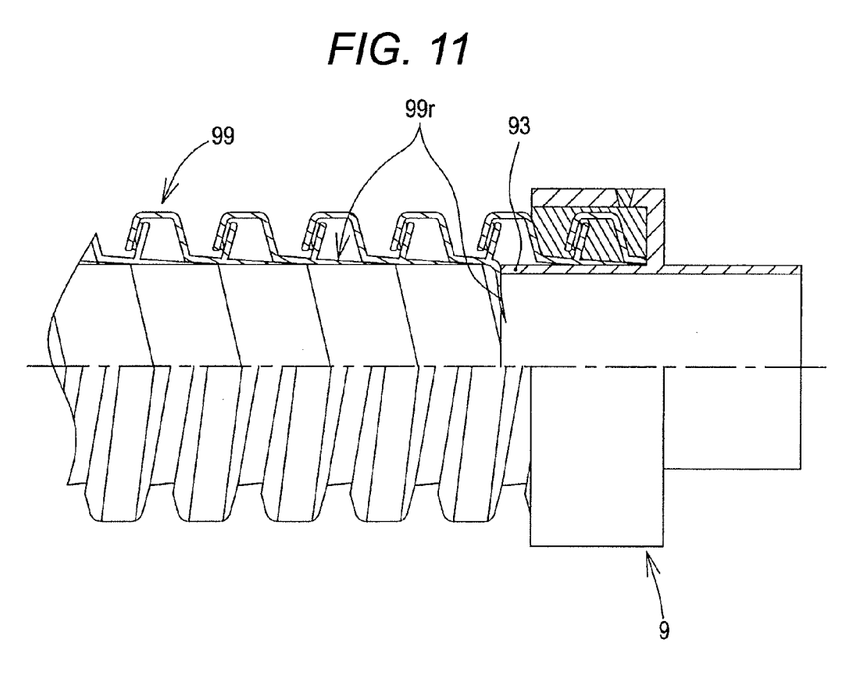
FIG. 11 is a partial cross-sectional view illustrating a state in which a lip is wrongly placed on an inner unit of a joint member in a comparative study example.

The present inventors have examined a flexible hose as disclosed in JP-A-2011-055877, for example. That is, the present inventors have examined the integration of a flexible hose 99 and a joint member 9 as illustrated in FIG. 11. The hose 99 includes a lip 99r for covering a spiral groove portion formed on an inner surface thereof, whereas the joint member includes an inner cylindrical unit 93. The present inventors have found that integrating the hose 99 with the joint member 9 may cause the lip 99r to be wrongly placed on the inner cylindrical unit 93 with expansion and contraction of the hose 99 in the vicinity of the connection between the hose 99 and the joint member 9.

When the lip 99r is placed on the inner cylindrical unit 93 of the joint member 9, a cross section area of a passageway of the hose 99 decreases. As a result, for example, the following problems occur. Fluid resistance of fluid (e.g., air) flowing inside the hose 99 increases. In addition, solid substances (dusts and debris in case of a vacuum cleaner, and granular materials in case of a grain conveying hose) flowing inside the hose 99 are stuck in a portion of the lip 99r placed on the inner cylindrical unit 93.

Therefore, one object of the present disclosure is to prevent a lip arranged on an inner surface of a hose from being placed on a joint member. Other objects of the present disclosure are to prevent an increase in flow resistance of the hose, and to prevent accumulation of debris and the like inside the hose.

The inventors of the present invention have found that both side edges of a lip are to be integrated with a hose as a result of dedication to studies.

Embodiments of the present disclosure are now described with reference to the accompanying drawings. However, the present disclosure is not limited to each of the embodiments below. The present disclosure includes modifications of such embodiments.

An exemplary hose assembly according the present embodiment is described.

Figure 1:
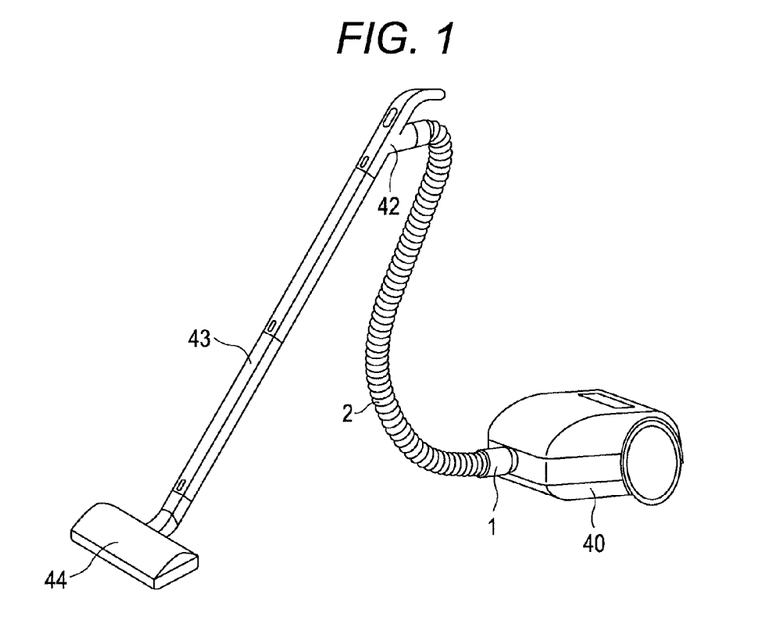
FIG. 1 is a schematic diagram illustrating an external appearance of a vacuum cleaner including a hose assembly according to the present disclosure.
Figure 2:
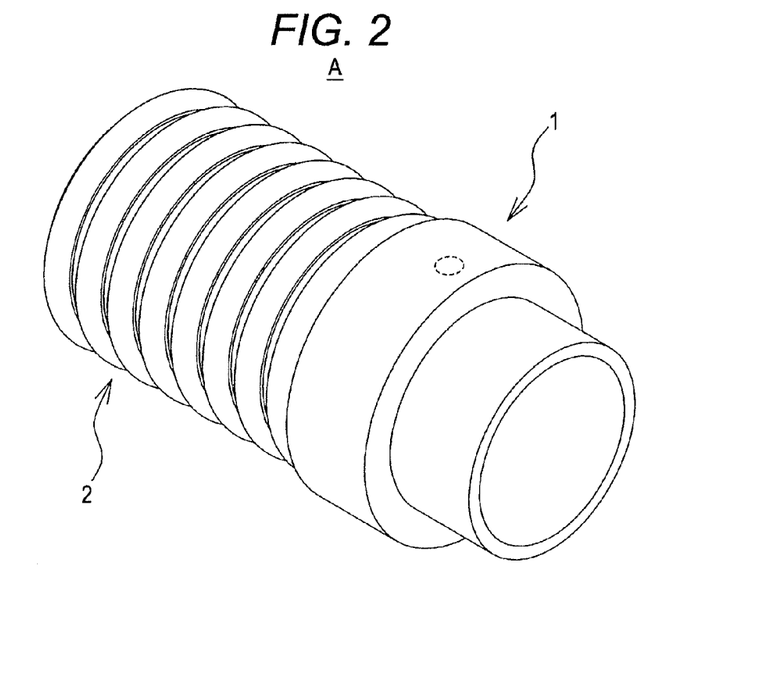
FIG. 2 is a perspective view illustrating an external shape of the hose assembly according to one embodiment of the present disclosure.

FIG. 1 is a diagram illustrating the entire external appearance of a vacuum cleaner according to the present embodiment. FIG. 2 is a schematic perspective view illustrating a configuration of a hose assembly used in the vacuum cleaner.

The vacuum cleaner includes a main body 40, a hose 2, a hand operation unit 42, an extension pipe 43, and a floor nozzle 44. The hose 2 has flexibility. The hose 2 is connected to a suction port through a connection pipe (joint member) 1, the suction port being arranged in the main body 40. The flexible hose 2 has the other end connected to one end of the hand operation unit 42. The other end of the hand operation unit 42 is connected to the extension pipe 43. The extension pipe 43 has the other end connected to the floor nozzle 44. These members may be detachable from one another.

Figure 3:
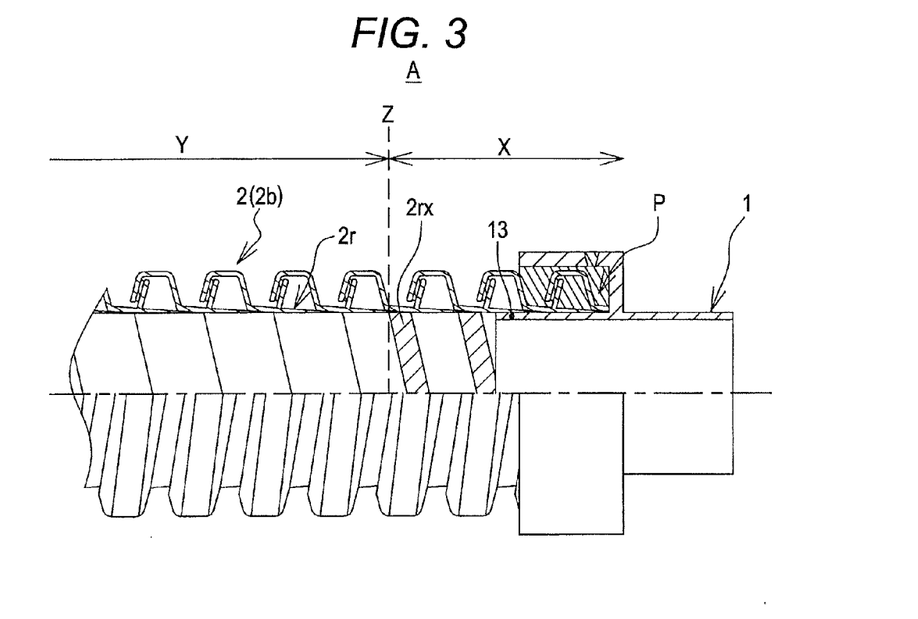
FIG. 3 is a partial cross-sectional view illustrating a structure of the hose assembly according to one embodiment of the present disclosure.

As illustrated in FIGS. 2 and 3, a hose assembly A of the present embodiment includes the connection pipe (joint member) 1 and the hose 2 integrally connected to the connection pipe 1. The hose 2 is partially shown in FIGS. 2 and 3. Herein, the joint member represents a hollow member that is connected to one end of the hose 2 and provided for connection to other member, for example. In the other words, the connection pipe 1 is a member directly connected to the hose 2. The configuration of the hose assembly according to the present embodiment is described in detail below.

As illustrated in FIGS. 2 and 3, an end portion of the hose 2 is inserted into one end side of the connection pipe 1. One portion of the connection pipe 1 and one portion of the hose 2 overlap each other in one section in an axial direction of the hose 2. In such a state, the connection pipe 1 and the hose 2 are integrally connected, so that the hose assembly A is provided. According to the present embodiment, these members are connected and integrated by insert molding, which is described later. The connection pipe 1 and the hose 2 are integrated by resin P injected therebetween in the insert molding.

Figure 4:
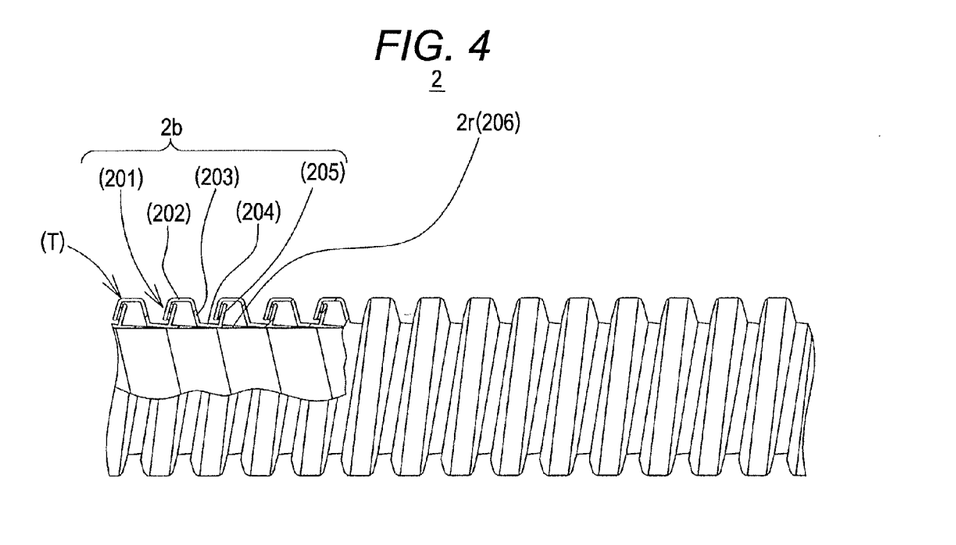
FIG. 4 is a partial cross-sectional view illustrating a shape of a hose used in one embodiment of the present disclosure.
Figure 5:
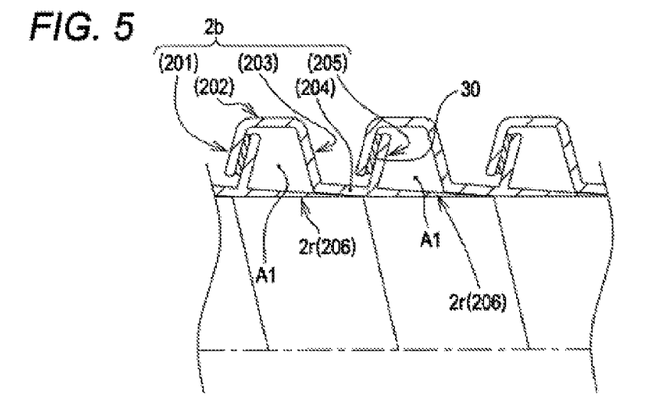
FIG. 5 is an enlarged cross-sectional view illustrating a wall portion of the hose used in one embodiment of the present disclosure.

Each of FIGS. 4 and 5 illustrates a shape of the hose 2. The hose 2 is made of synthetic resin (e.g., soft thermoplastic resin). The hose 2 includes a hose main body 2b and a lip 2r, which are integrated with each other. The hose main body 2b includes a protrusion portion and a groove portion formed in a spiral shape on an inner surface and an outer surface thereof. That is, the protrusion portion formed on the outer surface of the hose main body 2b corresponds to a groove portion formed on the inner surface of the hose main body 2b.

The lip 2r is spirally arranged in such a manner as to cover the groove portion formed on the inner surface of the hose main body 2b, the groove portion being in a spiral shape. Before the hose 2 and the connection pipe 1 are integrated (that is, the hose 2 only), one end of the lip 2r in an axial direction of the hose 2 is integrated with the protrusion portion on the inner surface of the hose main body 2b. On the other hand, the other end of the lip 2r (that is, a leading end of the lip 2r) is not integrated with the hose main body 2b, thereby being a free end.

Figure 6:
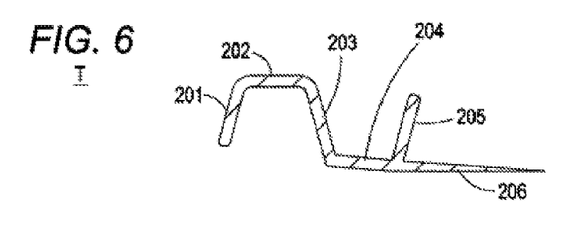
FIG. 6 is cross-sectional view illustrating a resin strip for manufacture of the hose used in one embodiment of the present disclosure.

More particularly, for example, the hose main body 2b and the lip 2r may be formed with a resin strip T having a substantially S-shaped cross section as illustrated in FIG. 6, which illustrates a width direction cross section of the resin strip T. The resin strip T is a strip-shaped member. A width direction cross-section structure of the resin strip T includes a first flat portion (outer circumferential portion) 202, a second flat portion (inner circumferential portion) 204, a first end portion (inward side edge) 201, a second end portion (free end, extension portion) 206, an inclined plane portion (a rising portion) 203, and a projection portion (outward side edge) 205. The outer circumferential portion 202 is a top surface (bottom surface) of an outer surface side protrusion portion (inner surface side groove portion) of the hose main body 2b. The inner circumferential portion 204 is a bottom surface (top surface) of an outer surface side groove portion (inner surface side protrusion portion) of the hose main body 2b. The inward side edge 201 extends in an inward direction of the hose main body 2b from the outer circumferential portion 202. The extension portion 206 is a horizontal extension portion of the inner circumferential portion 204. The rising portion 203 extends in an outward direction of the hose main body 2b from the inner circumferential portion 204, and coupled to the outer circumferential portion 202. The outward side edge 205 extends in an upper direction from a connection portion between the inner circumferential portion 204 and the extension portion 206, and substantially parallel to the inward side edge 201.

The hose 2 can be manufactured by spiral method using the resin strip T having such configuration. That is, the resin strip T is spirally wound, and side edge portions thereof being adjacent to each other (inward side edge 201 and outward side edge 205) for each winding turn are adhesively integrated, so that the hose 2 is manufactured. Detailed descriptions of structures and manufacturing methods of the resin strip T and the hose 2 are given below.

The strip T is made of a material such as a relatively soft synthetic resin (e.g., polyolefin resin), and produced by extrusion molding. Examples of the polyolefin resin to be used include a polypropylene resin (PP), a polyethylene resin (PE), and an ethylene-vinyl acetate copolymer (EVA). Alternatively, other resin materials such as a soft polyvinyl chloride resin (PVC resin) and a thermoplastic elastomer (TPE) may be used. The strip T is preferably made of a resin material having a hardness of approximately 70 to 95 (JIS shore hardness A).

The hose 2, for example, is manufactured as follows: First, a resin material is supplied to an extruding machine. The resin material is extruded from the extruding machine in a semi-molten state to produce the strip T. The extruded strip T is cooled, thereby fixing a sectional shape thereof. Then, the strip T is supplied to a publicly known hose-manufacturing device. That is, the strip T is spirally wound around the periphery of a guide shaft of the hose-manufacturing device. In this case, as illustrated in FIG. 6, the strip T is wound such that the precedingly wound outward side edge 205 and the inward side edge 201 overlap each other. An adhesive agent 30 is filled between the inward side edge 201 and the outward side edge 205 overlapped each other, thereby bonding the inward side edge 201 and the outward side edge 205. Consequently, the main body 2b of the hose 2 is provided with a protrusion portion and a groove portion formed in a spiral manner on an inner surface thereof.

The adhesive agent 30, for example, can be a hot-melt type adhesive agent made of the same type of resin as the strip T.

As described above, the strip T has a portion having the substantially S-shaped cross section (hereinafter referred to as a substantially S-shaped portion). The substantially S-shaped portion corresponds to the hose main body 2b. When the strip T illustrated in FIG. 6 is spirally wound, both ends thereof overlap each other, and are adhesively integrated with the adhesive agent 30 (an upper side of each of FIGS. 5 and 6 corresponds to an outside of the hose 2, whereas a lower side of each of FIGS. 5 and 6 corresponds to an inside of the hose 2). The inner circumferential portion 204 forms an inner surface of the hose 2 when the strip T is wound. The outer circumferential portion 202 forms an outer surface of the hose 2 when the strip T is wound. Therefore, the inner circumferential portion 204 is arranged near a central axis of the hose 2 relative to the outer circumferential portion 202. Moreover, the rising portion 203 extending outward is provided between the inner circumferential portion 204 and the outer circumferential portion 202. In an axial cross section of the hose 2, each of the inner circumferential portion 204 and the outer circumferential portion 202 extends substantially parallel to a central axis line of the hose 2. On the other hand, each of the inward side edge 201, the outward side edge 205, and the rising portion 203 is arranged such that a cross section thereof has a predetermined angle (preferably between 45 degrees and 90 degrees) with respect to the central axis line of the hose 2. Accordingly, the inward side edge 201, the outer circumferential portion 202, the rising portion 203, the inner circumferential portion 204, and the outward side edge 205 are provided in a linked manner, thereby forming the substantially S-shaped portion of the strip T. Thus, the substantially S-shaped portion forms the hose main body 2b, which defines an internal space and an external space of the hose 2.

As illustrated in FIG. 5, the wound strip T forms a protrusion portion and a groove portion with the inward side edge 201, the outer circumferential portion 202, the rising portion 203, and the inner circumferential portion 204. In the cross-sectional view of FIG. 5, a plurality of protrusion portions and a plurality of groove portions are alternatively arranged. In the present embodiment, however, one protrusion portion and one groove portion are actually provided in a spiral manner from one end to the other end of the hose 2 on an outer surface of the hose 2.

The extension portion 206 of the strip T functions as the lip 2r when the hose 2 is formed with the strip T. The extension portion 206 is molded integrally with the substantially S-shaped portion, thereby forming the strip T. When the strip T is spirally wound, the extension portion 206 is hidden from an outer side of the hose 2 by the inward side edge 201, the outer circumferential portion 202, and the rising portion 203. Thus, the extension portion 206 is positioned on an inner surface side of the hose 2. The extension portion 206 (lip 2r) covers a groove portion formed by the inward side edge 201, the outer circumferential portion 202, and the rising portion 203, the groove portion being formed on an inner surface side (inner groove portion) of the hose main body 2b. On the other hand, the rising portion 203, the inner circumferential portion 204, and the outward side edge 205 form a protrusion portion on an inner surface side (inner protrusion portion) of the hose main body 2b. Consequently, the inner protrusion portion and the lip 2r generally flatten an inner surface of the hose 2.

Specifically, the lip 2r is spirally arranged to cover the inner groove portion. Herein, the lip 2r has a first end portion (an end portion integrated with the inner protrusion portion) serving as a fixed end portion, and a second end portion serving as a free end as illustrated in FIG. 5. These end portions extend along a spiral direction of the hose 2, and are arranged in a hose axial direction. Accordingly, the second end portion of the lip 2r is not fixed with the inner protrusion portion being adjacent thereto, and slidable on the adjacent inner protrusion portion. In other words, the lip 2r cannot hinder expansion and contraction of the hose 2.

The lip 2r preferably has a length that allows a leading end of the lip 2r to overlap the adjacent inner circumferential portion 204 (inner protrusion portion) in a normal state in which the hose 2 is not expanded or contracted. Moreover, in case the hose assembly A is used for a vacuum cleaner, the leading end (free end) of the lip 2r preferably extends toward a direction in which the air flows inside the hose 2 from a viewpoint of reduction in air flow resistance.

Figure 7A:
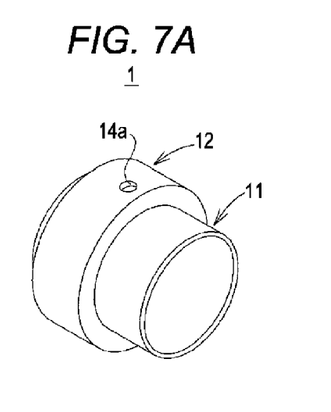
FIG. 7A is a perspective view illustrating a shape of a joint member used in one embodiment of the present disclosure.
Figure 7B:
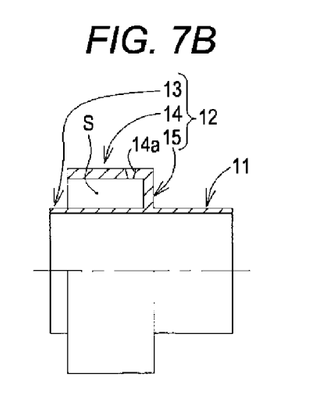
FIG. 7B is a cross-sectional view illustrating a shape of the joint member used in one embodiment of the present disclosure.

As illustrated in FIGS. 7A and 7B, the connection pipe 1 is a hollow cylindrical member in the present embodiment. For example, the connection pipe 1 is integrally formed by injection molding of synthetic resin. The connection pipe 1 includes an insertion unit 11 and a housing unit 12. The insertion unit 11 is used for connection to a connection target (e.g., the main body 40 of a vacuum cleaner). Therefore, the insertion unit 11 can have an optional shape according to the connection target.

As illustrated in FIG. 7B, the housing unit 12 includes two members such as an inner unit 13 and an outer unit 14 that are coaxially provided. For example, these two members may be two cylindrical units (an inner cylindrical unit and an outer cylindrical unit) that are concentrically provided and have different diameters. On the side of the insertion unit 11, one end of the inner unit 13 and one end of the outer unit 14 are integrated through a rising portion 15 provided on the side of the insertion unit 11. On the other hand, the other end of the inner unit 13 and the other end of the outer unit 14 are free ends. Consequently, an outer surface of the inner unit 13 and an inner surface of the outer unit 14 define a space S having a ring shape. This ring-shaped space S can insert and house therein an end portion of the hose 2 to be connected. That is, an end portion of the hose 2 is inserted into the ring-shaped space S, so that the connection pipe 1 and the hose 2 connect each other. For example, a shape of the connection pipe 1 can be determined in consideration of a shape of the hose 2 and an assembly process of the connection pipe 1 and the hose 2. For example, an outer diameter of the inner unit 13 is set such that an outer circumferential portion of the inner unit 13 is positioned in an inner circumferential portion of the hose 2. The housing unit 12 of the connection pipe 1 may have a projection, a tab, an elongated protrusion, a slit, a hole, and an opening as needed for engagement, for example.

Moreover, the outer unit 14 of the connection pipe 1 has a through hole 14a formed thereto. In the insert molding process described later, resin is injected to the ring-shaped space S of the housing unit 12 through the through hole 14a.

The connection pipe 1 can be made of a material such as a synthetic resin that is harder than a material used for the hose 2. For example, the synthetic resin suitable for the connection pipe 1 includes: a thermoplastic resin such as a polypropylene resin (PP), a polyamide resin (PA), and an acrylonitrile butadiene styrene resin (ABS resin); a thermosetting resin such as a rubber material; and a reaction curable resin such as an urethane resin.

As described above, one end of the lip 2r is a fixed end whereas the other end thereof is a free end. In the hose assembly A, however, both ends of the lip 2r are formed as fixed ends in the vicinity of the connection pipe 1. Such fixed ends are described below.

As illustrated in FIG. 3, the hose assembly A includes a region X (a first region) in the vicinity of the connection pipe 1, and a region Y (a second region) on a middle side of the hose 2. More specifically, the region X (first region) represents a region from an overlapping portion in which the hose 2 overlaps the inner unit 13 of the connection pipe 1 to a predetermined position Z in a middle side of the hose 2 in the hose assembly A. In the present embodiment, the predetermined position Z is a position apart from a leading end of the inner unit 13 of the connection pipe 1 toward the middle side of the hose 2 for approximately 0.3 to 5 rotations of a spiral-shaped inner groove portion. The predetermined position Z is preferably positioned apart from the leading end of the inner unit 13 for 1 to 5 rotations of the inner groove portion, and more preferably positioned apart for 2 rotations of the inner groove portion.

In addition, the region Y (second region) represents a region excluding the region X in the hose assembly A, and provided toward the middle side of the hose 2 relative to the predetermined position Z.

The region Y, therefore, corresponds to a state in which the hose 2 is manufactured as a single unit. That is, one end of the lip 2r is a fixed end integrated with an inner protrusion portion, and the other end is a free end capable of sliding on an adjacent inner protrusion portion as described above.

In the region X, on the other hand, both ends of the lip 2r are fixed ends fixed to the respective inner protrusion portions as described above. In the region X, therefore, the lip 2r does not have an end portion capable of sliding on an inner protrusion being adjacent thereto. In FIG. 3, the lip 2r has a hatched portion 2rx that is fixed to (integrated with) an adjacent inner protrusion portion.

Next, a description is given of a method for manufacturing the hose assembly A as illustrated in FIG. 3 from the connection pipe 1 and the hose 2.

Each of the connection pipe 1 and the hose 2 is manufactured by a publicly known method beforehand.

Prior to integration of the connection pipe 1 and the hose 2, a free end of the lip 2r undergoes a process for fixing (integrating) thereof to an adjacent inner protrusion portion. Herein the process is performed in a portion to become the region X of the hose 2. Although such a process can be performed with an adhesive agent or by thermal fusion bonding, for example, the description herein is given of an example case in which the process is performed by thermal fusion bonding.

Figure 8A:
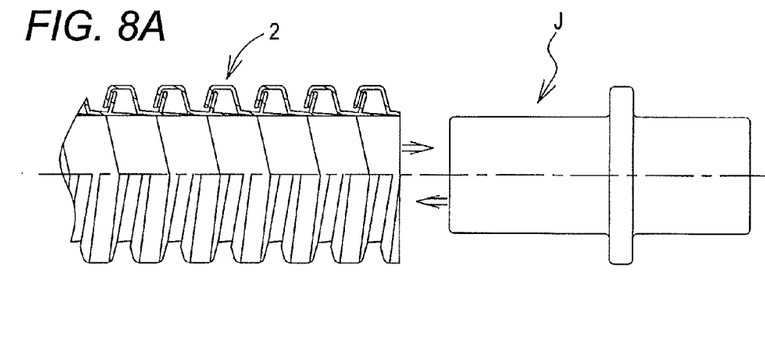
FIGS. 8A through 8C are schematic diagrams illustrating respective steps in a method for integrating a hose end portion and a lip according to one embodiment of the present disclosure.

As illustrated in FIG. 8A, a heated processing jig J is inserted into one end of the hose 2 to be processed. The processing jig J is made of a metal or the like, and has a cylindrical portion capable of fitting to an inner circumference of the hose 2. The cylindrical portion of the processing jig J is set to have a length corresponding to the region X. The processing jig J preferably has a ring-shaped flange capable of regulating excessive insertion into the hose 2.

Figure 8B:
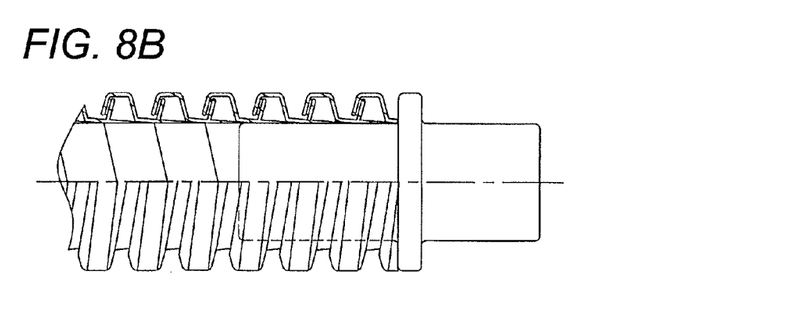
Figure 8C:
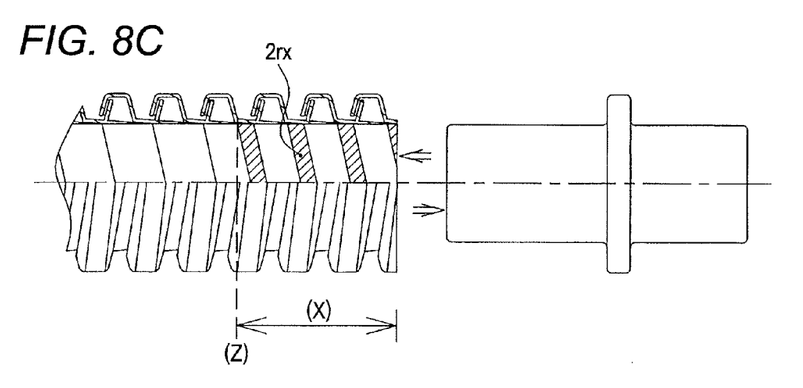

FIG. 8B illustrates a state in which the processing jig J is inserted into a predetermined position inside the hose 2. In such a state, the lip 2r and an inner protrusion portion being in contact with the processing jig J are softened and melted by heat of the processing jig J, so that the lip 2r and the inner protrusion portion are fused together. Then, the processing jig J is pulled out from the end portion of the hose 2. As illustrated in FIG. 8C, the hose 2 subsequent to the process is provided with a region including the lip 2r having the portion 2 rx integrated with an adjacent protrusion portion.

Now, a description is given of a process for integrating the connection pipe 1 and the hose 2, which has undergone the above process for the lip 2r. Herein, the connection pipe 1 and the hose 2 are integrated by insert molding.

Figure 9A:
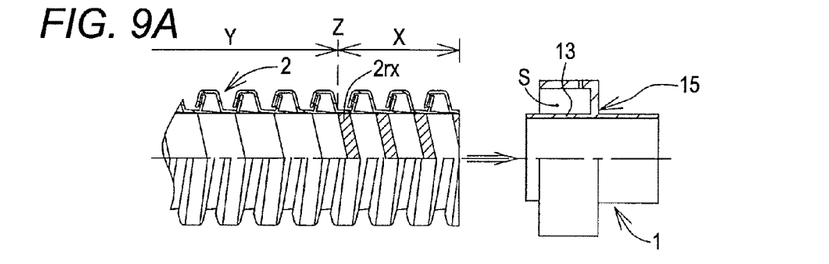
FIGS. 9A through 9D are schematic diagrams illustrating respective steps in an insert molding method for integrating the hose and the joint member according to one embodiment of the present disclosure.
Figure 9B:
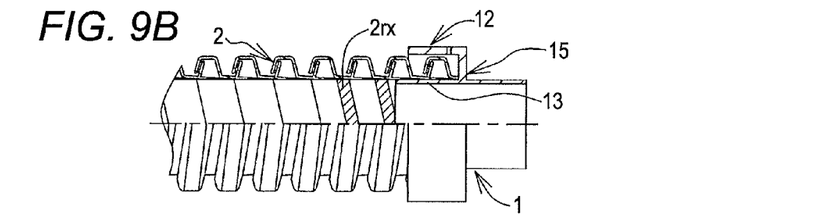

As illustrated in FIGS. 9A and 9B, an end portion of the hose 2 having undergone the process for the lip 2r is inserted into the ring-shaped space S of the housing unit 12 of the connection pipe 1. The hose 2 is preferably inserted until the end portion thereof contacts the rising portion 15 so that the hose 2 and the connection pipe 1 are surely connected. Herein, the region X of the end portion of the hose 2 (rip is already processed) expands toward the middle portion side of the hose 2 beyond the portion in which the inner unit 13 of the connection pipe 1 and the hose 2 overlap. That is, the portion 2rx formed by integration of the lip 2r with the adjacent inner protrusion portion is provided outside the inner unit 13 and in the middle side of the hose 2. In other words, the region X has a length that is longer than that of the portion in which the hose 2 and the inner unit 13 overlap along an axial direction of the hose 2.

The end portion of the hose 2 is inserted into the housing unit 12 of the connection pipe 1 and set inside a mold M. The mold M houses the hose 2 and the connection pipe 1 therein such that a predetermined hose assembly shape (illustrated in FIG. 2) is obtained. The mold M is an insert-molding mold known by the persons skilled in the art. The mold M may have a core mold to be inserted inside the connection pipe 1 and the hose 2 as needed.

Figure 9C:
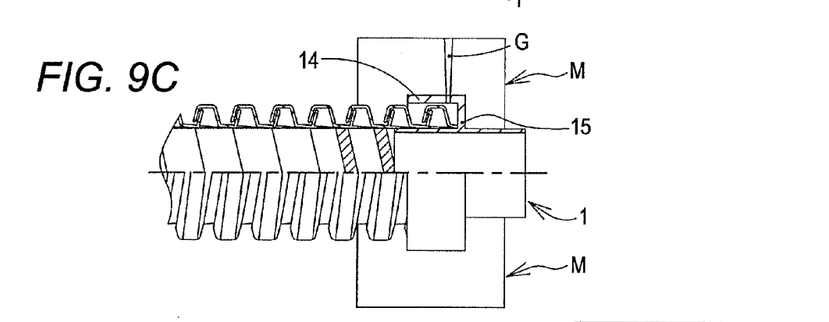

The end portion of the hose 2 and the connection pipe 1 are set inside the mold M and are clamped by the mold M, so that resin is injected thereto (FIG. 9C). In the present embodiment, the resin is injected through a gate G opened to the through hole 14a provided on the outer unit 14. The resin may be injected from other portions as needed.

The molten resin injected from the gate G reaches inside the housing unit 12 through the through hole 14a, and then filled into a space between the end portion of the hose 2 and the housing unit 12. When the resin P is solidified, the end portion of the hose 2 and the housing unit 12 (connection pipe 1) are integrally joined. The injected resin P is also filled into the through hole 14a provided on the housing unit 12.

Figure 9D:
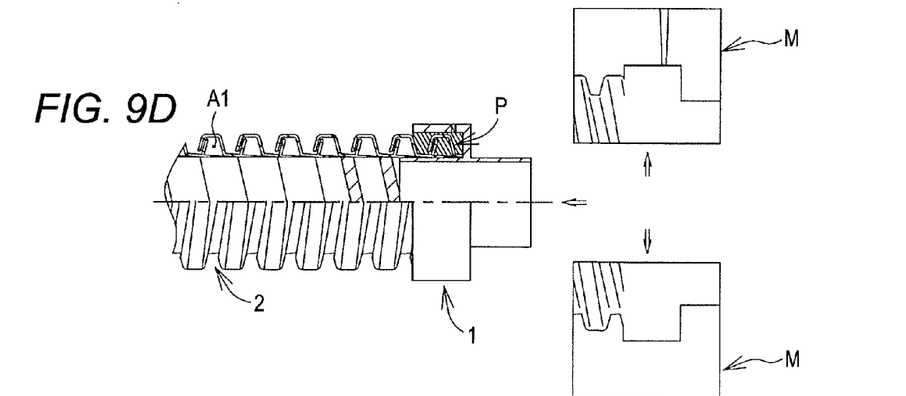

When solidification of the injected resin P is completed, the mold M is opened. The hose assembly A with integration of the hose 2 and the connection pipe 1 is removed from the mold M (FIG. 9D), and the insert molding ends.

An action and an effect of the present disclosure are now described. According to the present disclosure, the region X formed on an end portion of the hose 2 is longer than the housing unit 12 of the connection pipe 1. In the region X, moreover, both ends of the lip 2r are fixed to (integrated with) the respective inner protrusion portions. Accordingly, even when the hose 2 is expanded and contracted in the vicinity of the connection pipe 1, the lip 2r of the hose 2 is prevented from being placed on the inner unit 13 of the joint member. Therefore, the present disclosure can prevent, for example, an increase in fluid resistance of the hose 2 and an occurrence of stuck solid substances caused by riding up on the inner unit 13 by the lip 2r.

Moreover, since the lip 2r has a free end in the other portion of the hose 2 (region Y), the expansion and contraction of the hose 2 is not inhibited by the lip 2r. Therefore, the hose 2 can maintain flexibility thereof.

When the connection pipe 1 and the hose 2 are to be integrated, the region X preferably extends out from the connection pipe 1 for a predetermined length along an axial direction of the hose 2 from a viewpoint of surely preventing a case where the lip 2r rides on the inner unit 13. This predetermined length preferably corresponds to at least one spiral rotation of a protrusion portion or a groove portion of the hose 2. That is, the predetermined position Z illustrated in FIG. 3 is preferably provided apart from a leading end of the inner unit 13 for at least one spiral rotation of the groove portion of the hose 2.

As described above, the hose 2 has such configurations, so that both ends of the lip 2r can be integrated with the respective protrusion portions across the entire circumference of the hose 2 in the vicinity of a leading end of the inner unit 13. Accordingly, the lip 2r can be surely prevented from riding up on the inner unit 13.

The present disclosure is not limited to the above embodiment. The present disclosure includes various modifications. Other embodiments of the present disclosure are described below by mainly referring to the differences from the above embodiment. Detailed descriptions of components similar to those described in the above embodiment are omitted. The modifications below may be implemented by combining one part thereof with other or replacing one part thereof with other.

Figure 10A:
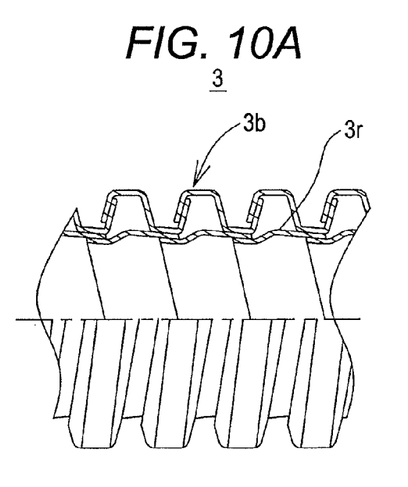
FIGS. 10A and 10B are cross-sectional views illustrating examples of other shapes of the hose used in the present disclosure.
Figure 10B:
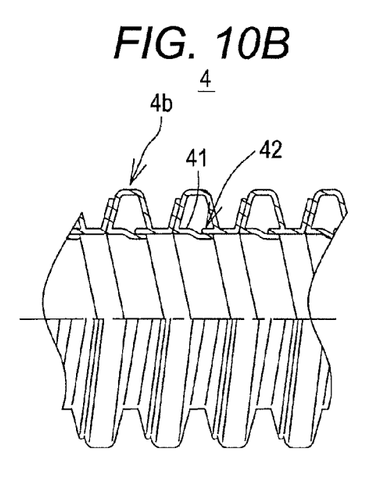

A description is given of a modification of a hose that can be used in the present disclosure. FIGS. 10A and 10B are each cross-sectional views illustrating modification examples of hoses. A hose 3 illustrated in FIG. 10A has a hose main body 3b and a lip 3r that are formed of separate resin strips. A first end portion of the lip 3r is bonded and integrated with an inner protrusion portion of the hose main body 3b. A second end portion of the lip 3r is a free end. This free end is arranged to overlap a first end portion of an adjacent lip. When the hose 3 is used, a lip process as similar to the above first embodiment is performed in an end portion of the hose 3, so that an effect similar to the above embodiment can be obtained. That is, the integration of the lip 3r and the hose main body 3b is not limited to a special manner. The lip 3r and the hose main body 3b can be integrated by bonding as described in the present embodiment.

In the present embodiment, processes similar to those illustrated in FIGS. 8A through 8C can be performed. That is, both ends of the lip undergo an integration process in a predetermined region of an end portion of the hose 3. In such a case, the second end portion (free end) of the lip 3r is integrated with a first end portion of an adjacent lip. Accordingly, a counterpart to be fixed to the second end portion (free end) of the lip 3r is not necessarily the hose main body 3b, and may be an adjacent lip 3r. In other words, in the region X, both ends of the lip 3r can be connected to and integrated with an inner protrusion portion of the hose 3 and/or an adjacent lip 3r such that the both ends of the lip 3r become fixed ends.

A hose 4 illustrated in FIG. 10B is similar to the first embodiment except for lips 41 and 42. The lips 41 and 42 are arranged on substantially the same plane. The lip 41 protrudes in a direction similar to the lip 2r of the first embodiment, whereas the lip 42 protrudes opposite to the lip 41. In other words, the lips 41 and 42 are integrally provided to protrude from a protrusion portion adjacent to both sides of a groove portion. As illustrated in a cross-sectional view of the hose 4 in FIG. 10B, a pair of lips (lips 41 and 42) is arranged to overlap each other with respect to one inner groove portion. When such a hose 4 is used, the lips 41 and 42 can undergo a process similar to that performed on the end portion of the hose 2, thereby obtaining an effect similar to that obtained by the above embodiment. That is, a plurality of paired lips 41 and 42 (e.g., two) may be provided for every groove portion.

Moreover, the spiral-shaped groove portion or protrusion portion of the hose main body is not limited to a specific style. For example, the number of spiral threads may be 1, 2, or 3.

According to the above embodiment, the free end of the lip is integrated with the hose by thermal fusion bonding in the region X in the vicinity of the joint member. However, a method for fixing the free end of the lip to the hose is not limited to the thermal fusion bonding. For example, a hose inner surface may be processed by application of a molten resin or an adhesive agent in a portion to become the region X of the hose end, thereby obtaining the similar effect as the above embodiment. Alternatively, a film may be bonded to a hose inner surface of a portion to become the region X. Free ends of lips may be spirally fixed (integrated) continuously as illustrated FIG. 3 in the first embodiment. Alternatively, free ends of lips may be fixed (integrated) in an intermittent manner.

Alternatively, an adhesive agent or a molten resin may be filled into a spiral space enclosed with an inner groove portion and a lip in a portion to become the region X of the hose end. Even in such a case, both ends of the lip can be fixed to (integrated with) a hose main body in the region X. When a joint member and a hose are to be integrated using insert molding, the joint member and the hose are preferably provided such that a resin to be injected by the insert molding enters a spiral space. Accordingly, the insert molding and the lip process can be performed simultaneously, thereby enhancing production efficiency. Prior to the integration of the joint member and the hose, for example, an adhesive agent may be filled into the spiral space.

Hereinafter, modified examples of a joint member usable in the present disclosure will be described. When the joint member and a hose is integrated, the joint member is not limited to a particular shape as long as the joint member has an inner unit be arranged on a hose inner surface. Configurations of the inner unit, an outer unit, and a rising portion of the joint member can be modified. For example, each of these portions may have a slit and a protrusion for engagement. Alternatively, the outer unit or the rising portion of the joint member may be eliminated. Alternatively, the joint member may form a portion of a hand operation unit of a vacuum cleaner.

The description of the above embodiment has been made on the example of the hose assembly manufacturing process, including a process for integrating the joint member manufactured beforehand with the hose by insert molding. However, the joint member may be directly molded and integrated with a hose end by using insert molding without being manufactured beforehand. That is, the joint member may be formed by insert molding in the present disclosure.

Moreover, the description of the above embodiment has been made on the example of integration of the joint member and the hose by using insert molding. However, the joint member and the hose may be integrated by other connection methods. For example, a joint member and a hose may be integrated by bonding with an adhesive agent or by thermal fusing bonding. Alternatively, for example, a joint member may be mechanically engaged with a hose in a screw-in manner for integration.

In the hose assembly according to the above embodiment, the joint member is provided to only one end of the hose. However, the present disclosure is not limited thereto. For example, a joint member may be provided to both ends of a hose. In such a case, both ends of the hose have any of the configurations described in the above embodiment.

Moreover, the description of the above embodiment has been made on the hose assembly to be used in a vacuum cleaner. However, the present disclosure may be applied to various technical fields using flexible hoses such as fields of ventilation, suction, water supply, and slurry transportation in addition to the vacuum cleaner.

Therefore, the hose assembly according the present embodiment is used, for example, in a vacuum cleaner, and easy to be connected utilizing a joint member. Moreover, the hose assembly according the present embodiment can prevent a lip from riding over (being wrongly placed on) an inside portion thereof.

The hose assembly of the present disclosure can be expressed as follows.

A first aspect of the present disclosure is a hose assembly (A) including a flexible hose (2) and a joint member (connection pipe) (1), where the flexible hose (2) and a joint member (connection pipe) (1) are integrated with each other so as to be partially overlapped with each other. In this hose assembly (A), the joint member (1) includes an inner unit (13) to be arranged in an inner circumference of the hose (2). The hose (2) has a hose main body (2b) and a lip (2r). The hose main body (2b) has a groove portion and a protrusion portion in a spiral manner on an inner surface thereof. The lip (2r) is integrated with the protrusion portion and spirally provided to cover the groove portion. Furthermore, in a first region (X) from an overlapping portion in which the hose overlaps an inner unit of the joint member to a predetermined position (Z) in a hose middle side by extending beyond the overlapping portion, both side edges (both end portions) of the lip are integrated with protrusion portions and/or lips. In a second region (Y) from the predetermined position (Z) to the hose middle side, a side edge (end portion) of one side of the lip serves as a sliding edge (free end) being not integrated with the hose.

In the first aspect, a region extending beyond the overlapping portion and provided across at least one spiral rotation of the groove portion of the hose main body (2b) may preferably be the first region (X) (second aspect). Moreover, in the first aspect, one lip (2r) may be provided with respect to one groove portion (third aspect). Alternatively, a pair of lips (2r) may be provided with respect to one groove portion, and side edges (end portions) of the lips are integrated with respective protrusion portions of both sides of the groove portion, so that the paired lips may be integrated together in the first region (fourth aspect).

The hose assembly according to the first aspect prevents the lip provided on a hose inner surface from riding up on a joint member, and also prevents an increase in fluid resistance of a hose and accumulation of debris and other thereinside.

Moreover, the hose assembly can obtain an effect of surely preventing a case where a lip rides up on a joint member when a region extending beyond the overlapping portion and provided across at least one spiral rotation of the groove portion of the hose main body (2b) is the first region (X) as similar to the second aspect.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A hose assembly comprising:
   a hose; and
   a joint member integrated with the hose,
   wherein
   the joint member includes an inner unit to be arranged on an inside of the hose,
   the hose includes a hose main body and a lip,
   the hose main body includes a groove portion and a protrusion portion formed in a spiral shape on an inner surface thereof,
   the lip includes a first end portion and a second end portion aligned in an axial direction of the hose, and the lip is spirally provided on the inner surface of the hose main body to cover the groove portion,
   the first end portion includes a fixed end integrated with the protrusion portion,
   the hose further includes a first region and a second region adjacent to the first region in the axial direction of the hose, the first region including an end portion of the hose fitting to the inner unit of the joint member and a portion of the hose being provided next to the end portion and extending out from the inner unit,
   the lip further includes
      a portion positioned within the first region, and
      a portion different from the part of the lip positioned within the first region positioned within the second region, and
   the second end portion includes a fixed end integrated with the protrusion portion within the first region, and a free end not integrated with the protrusion portion within the second region.

2. The hose assembly according to claim 1, wherein the extending-out portion of the first region corresponds to at least one spiral rotation of the groove portion formed in the spiral shape on the hose main body with respect to a central axis of the hose.

3. The hose assembly according to claim 1, wherein one lip is arranged with respect to one groove portion.

4. The hose assembly according to claim 1, wherein the first end portion of the lip is fixed with the protrusion portion by thermal fusion bonding in the first region.

5. The hose assembly according to claim 1, wherein the second end portion of the lip is fixed with the protrusion portion by thermal fusion bonding in the first region.

6. A hose assembly comprising:
   a hose including a hose main body and a lip; and
   a joint member integrated with the hose and having an inner unit inside the hose, wherein
   the hose main body, on an inner surface thereof, includes a groove portion and a protrusion portion formed in a spiral shape,
   the lip is spirally provided on the inner surface of the hose main body to cover the groove portion,
   the lip includes a first portion and a second portion aligned in an axial direction of the hose,
   the hose further includes
      a first region including an end portion of the hose fitting to the inner unit of the joint member and a portion of the hose provided next to the end portion and extending out from the inner unit, and
a second region adjacent to the first region in the axial direction of the hose, the first portion of the lip include fixed ends integrated with the protrusion portion in the first and second regions, the second portion of the lip includes fixed ends integrated with the protrusion portion in the first region, and includes free ends not integrated with the protrusion portion in the second region.

* * * * *